United States Patent

[11] 3,552,603

[72] Inventors Pavol Hrivak,
Koloman Ondrejmiska, and Amadeus
Pechar, Svit, and Jan Koren, Poprad,
Czechoslovakia
[21] Appl. No. 792,197
[22] Filed Dec. 26, 1968
[45] Patented Jan. 5, 1971
[73] Assignee Vyskumny ustav chemickych vlakon
Svit, Czechoslovakia
a firm

[54] DEVICE FOR THE FEEDING OF MIXTURES INTO MELTED MASSES OF SYNTHETIC POLYMERS
9 Claims, 1 Drawing Fig.
[52] U.S. Cl. .................................................. 222/1,
222/145, 222/146, 222/333; 137/340; 417/3;
137/566, 137/1, 137/604
[51] Int. Cl. ..................................................... B67d 5/60,
B67d 5/62
[50] Field of Search ........................................... 222/255,
134, 135, 138; 222/1up, 145up, 146Hup, 333;
103/87Hup, 5up

[56] References Cited
UNITED STATES PATENTS
2,142,062  12/1938  Thurman ..................... 222/135X
2,737,978  3/1956  Ebertz ......................... 222/135X

*Primary Examiner*—Robert B. Reeves
*Assistant Examiner*—H. S. Lane
*Attorney*—Arthur O. Klein ABSTRACT: Apparatus for feeding mixtures to molten masses of synthetic polymers which comprises a storage container for the mixtures to be fed, a first unheated feed pump connected thereto, a supply line from said first unheated feed pump to a heating member, a second heated feed pump connected to the heating member, a feed inlet for the molten mass, said inlet connected to said second heated feed pump and downstream thereof, a third feed pump for the molten mass of polymer downstream of said second heated feed pump and said feed inlet, and a transfer mechanism from which each of the said three pumps is driven. The apparatus is useful for adding pigmented pastes as well as other dispersions and liquids to polymer melts, including such materials as antioxidants, modifiers, softeners, and others. Polymers used may include polyolefins, polyesters and polyamides.

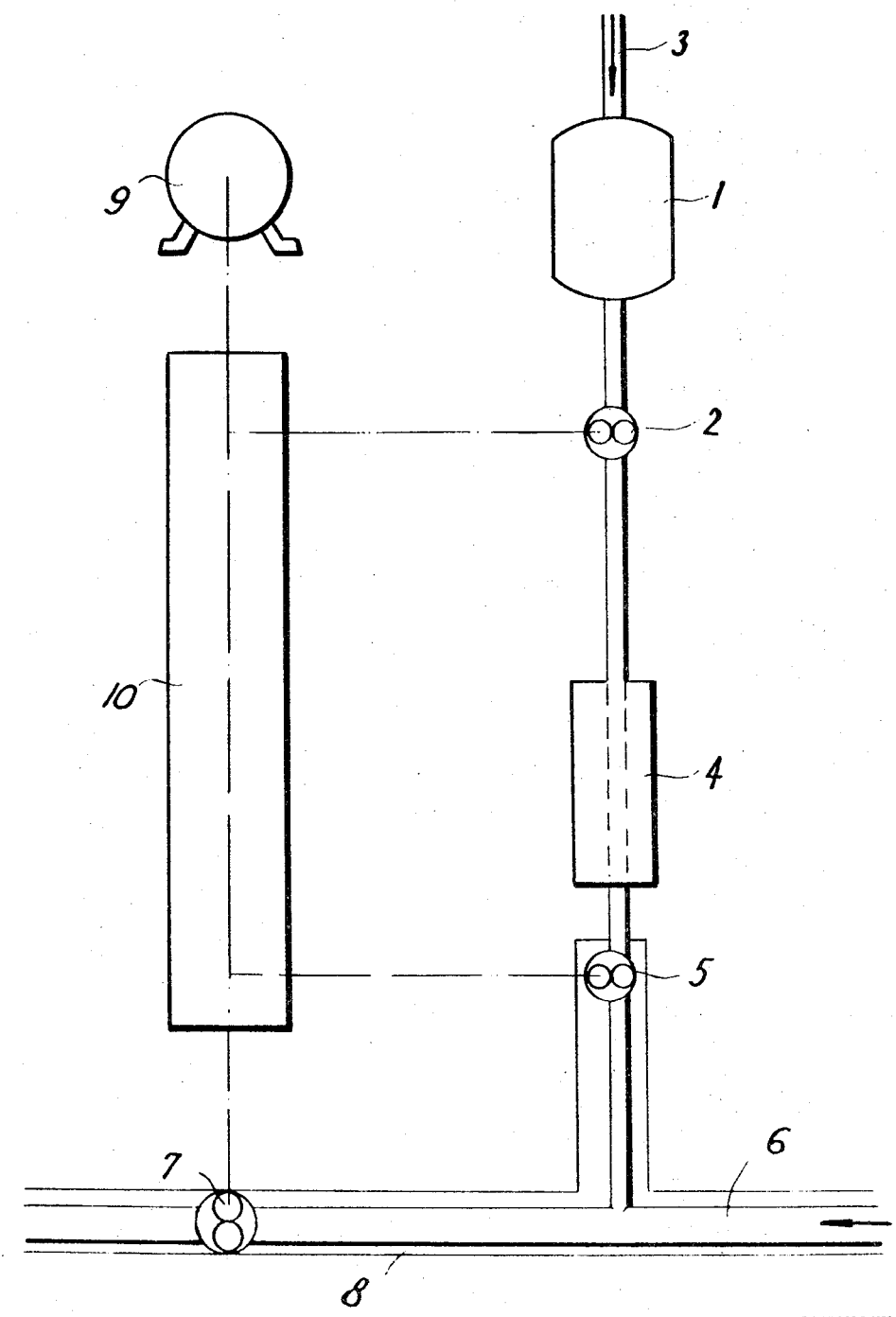

DEVICE FOR THE FEEDING OF MIXTURES INTO MELTED MASSES OF SYNTHETIC POLYMERS

This invention relates generally to an apparatus or device for feeding mixtures into a molten mass of synthetic polymers with the assistance of feed pumps.

Hitherto, mixtures were usually passed into a polymer before it was melted or else a feed system with a pump was used. As such mixtures, the commonest ones employed are pigment dyes in the form of dispersions in the appropriate medium, stabilizers for use against the effects of light and heat, and various types of modifiers.

When feeding these mixtures into a molten mass of polymer, it is necessary for them to be heated previous to feeding so that there is no cooling and solidifying at their point of contact with the molten polymer mass. A further requirement is that there be a sufficiently high pressure of mixture behind the feed pump, such pressure is necessary to overcome the counterpressure of the molten mass.

It has now been ascertained experimentally that, for example, during feeding of a heated pigment paste by means of a heated feed pump, the effect of this system alters very markedly depending on the pressure of the paste upstream of the feed pump. With higher pressures the result is that the paste slides through the pump and does so in such a quantity that the final amount of paste is practically independent of the number of revolutions of the feed pump. It was found that this system could be used satisfactorily only on the condition that the difference in pressures upstream of the pump (the mixture pressure) and downstream of the pump (the molten polymer pressure) was either a zero value or was very low. The result is the necessity for regulation of the pressure of the mixture depending on the pressure of the polymer melt, which can often change during the course of the operation.

In another method for adding the mixtures, feeding with a cold pump is used and the mixtures are warmed to the required temperature before they enter the melt. An advantage of feeding through a cold pump is the possibility of exact feed control of the mixture. The great disadvantage of this process, however, lies in the possibility that as the melted mass of polymer slides through and into the feed tube for the mixture, it may also solidify at the colder places. A similar situation also often arises even with differential feeding where the mixtures for use in the melted mass of polymer are passed between two pumps of different feeds. This disadvantage is usually overcome by using different types of no-return (oneway) valves which permit passage of the mixture into the melt but which are intended to prevent any penetration of the melt back into the feed system. At present, major use is made of different types of oneway ball or needle valves, or else passage of the melt back into the inlet for the mixtures is prevented by using a tube of Teflon which covers the outlet openings of the tube for supplying the mixtures. However, the functioning of these valves is very undependable and there is no assurance of adequate safety of operation. Frequent interruptions and the necessity of changing the valves considerably lowers production output.

An object of the present invention is to obviate or mitigate the shortcomings and disadvantages of the present systems as set forth above.

According to the present invention there is provided a method for and an apparatus for the feeding of mixtures to molten masses of synthetic polymers, such as polyolefins, polyamides and polyesters and mixtures thereof, the apparatus comprising a storage container for the mixtures, the inlet of a first unheated feed pump connected thereto, a supply tube from said unheated feed pump to a heating member, the inlet of a second heated feed pump connected to the heating member, an inlet feed line for the molten mass connected to the second heated feed pump and downstream thereof, a third feed pump for the molten mass of polymer downstream of the second heated feed pump and the inlet feed and a transmission mechanism from which each of said pumps is driven.

The first unheated feed pump is used, in practice, for accurate measurement and feeding of the mixtures, with the essential function of a nonreturn valve being assumed by the said second heated feed pump which is adjusted to any desired feed, which level is usually somewhat higher than that provided by the first unheated feed pump. The first unheated feed pump measures and compresses the mixture through a heated pipe to the second heated feed pump which ensures the passage of the total measured quantity of feed mixture into the molten mass of polymer and at the same time prevents penetration of the polymer melt into the mixture infeed line. Advantages of the apparatus of the present invention lie in the fact that its operation is not affected by changes in the melt pressure and that accurate feed of the mixtures with reference to the polymer can be obtained with a simple transmission between the revolutions of the main feed pump for the molten mass of polymer and the revolutions of the unheated feed pump for the mixture.

An embodiment of the present invention is described hereinbelow solely by way of example, with reference to the accompanying drawing.

Referring to the drawing, mixtures, e.g. pigment pastes and the like are fed from a storage container 1 to the inlet of a first unheated feed pump, preferably a geared pump 2 by means of nitrogen under pressure which is supplied to the storage container by means of inlet tube 3. The unheated geared pump 2 serves to provide accurate measurement of the required quantity of mixtures which are then passed through a heating device 4 into a heated feed pump, preferably a geared pump 5. The mixtures are then injected into the molten mass of polymer which is passed through tube 6 to the inlet of a feed pump 7 for the melt. Geared pumps 5 and 7 and the tube 6 for the molten polymer mass are heated by a heating mantle 8.

The speed of feed pump 7 for the melt is controlled with reference to the supply of melt upstream of this pump. An electric control motor 9 serves to regulate this speed. The speeds of the pumps 2 and 5 are fixed relative to the speed of the feed pump 7 for the melt with the aid of a transmission mechanism 10 and by means of this there is obtained a steady concentration of mixture in the polymer even if an alteration in the polymer melt supply should arise. The required concentration of mixtures in the polymer is obtained by adjusting the reciprocal relationship of the speeds of the pumps 2 and 7. The reciprocal relationship of the speeds of pumps 2 and 5 is adjustable and is selected in accordance with the requirements of the technology and the physical properties of the mixtures.

It is in no way necessary or intended to limit the drive mechanisms of the pump to any specific method. There may be used a hydraulic drive with regulation of the rotating speed and synchronization of the rotating speed or by means of mutually synchronized electric motors provided with regulating means; furthermore such as a synchronous electric motor with a variator, a mechanical drive with exchangeable toothed wheels, and a number of other systems. The synchronizing methods can be equally different.

The apparatus is useful for adding pigmented pastes as well as other dispersions and liquids to polymer melts, including such materials as antioxidants, modifiers, softeners, and others. Polymers used may include polyolefins, polyesters and polyamides.

The invention has been described hereinabove in a preferred embodiment, but it is to be understood that the invention is in no way confined to the particular forms, uses or sizes shown and described, the same being merely illustrative, and that the invention may be made and carried out in other ways without departure from the spirit of the invention, and therefore there is claimed the right to employ all equivalents coming within the scope of the appended claims and by means of which the objects of the invention are obtained and new results and advantages accomplished.

We claim:

1. An apparatus for the feeding of mixtures to molten masses of synthetic polymers which comprises a storage container for the mixtures to be fed, a first unheated feed pump having an inlet and an outlet and being connected at its inlet to said storage container, a supply line from the outlet of said first unheated feed pump to a heating member, a second heated feed pump having an inlet and an outlet and being connected at its inlet to the heating member, a feed inlet for the molten mass, said inlet connected to the outlet of said second heated feed pump and downstream thereof, a third feed pump for the molten mass of polymer downstream of said second heated feed pump and said feed inlet, and a transmission mechanism from which each of the said three pumps is driven.

2. The apparatus described in claim 1 wherein said second heated feed pump, the feed inlet, and said third feed pump for the molten mass of polymer are heated by means of a heating mantle enclosing said pumps and inlet. D1505

3. The apparatus described in claim 1 wherein each of the pumps is a gear pump.

4. The apparatus described in claim 1 wherein the storage container is provided with an inlet for pressurized gas for feed of a mixture stored therein to said first unheated feed pump.

5. The apparatus as set forth in claim 1, wherein said transmission mechanism is operatively connected to said first, second and third pumps and adjusts the respective velocities thereof.

6. The apparatus described in claim 5, wherein said second heated feed pump, the feed inlet, and the feed pump for the molten mass of polymer are heated by means of a heating mantle enclosing said pumps and inlet.

7. The apparatus described in claim 5, wherein each of the pumps is a gear pump.

8. The apparatus described in claim 5, wherein the storage container is provided with an inlet for pressurized gas for feed of a mixture stored therein to the first unheated feed pump.

9. A process for feeding a mixture to a molten mass of synthetic polymers comprising:

the steps of pumping said mixture out of a storage container by means of a first unheated pump connected thereto to a heating member;

pumping said mixture out of said heating member by means of a second heated pump connected thereto thereby accurately removing a predetermined quantity of said mixture;

injecting said predetermined quantity of heated mixture into said molten mass of synthetic polymer while maintaining the latter in a heated state;

pumping said heated molten mass of synthetic polymer and said mixture by means of a third feed pump to an outlet; and synchronizing said first, second and third pumps.